United States Patent [19]

Oinoue et al.

[11] Patent Number: 4,766,583
[45] Date of Patent: Aug. 23, 1988

[54] OPTICAL PICKUP DEVICE WITH OBJECTIVE LENS MOVABLE IN TWO DIRECTIONS

[75] Inventors: Hiroshi Oinoue, Tokyo; Yoshimasa Goda, Kanagawa, both of Japan

[73] Assignee: Sony Corporation, Tokyo, Japan

[21] Appl. No.: 896,922

[22] Filed: Aug. 15, 1986

[30] Foreign Application Priority Data

Aug. 16, 1985 [JP] Japan .................................. 60-180145

[51] Int. Cl.⁴ ........................... G11B 7/08; G02B 7/02
[52] U.S. Cl. ...................................... 369/45; 369/44; 250/201; 350/247
[58] Field of Search ................... 369/44, 45; 350/247, 350/255; 250/201 DF

[56] References Cited

U.S. PATENT DOCUMENTS

| | | | |
|---|---|---|---|
| 4,449,213 | 5/1984 | Noborimoto et al. | 369/45 |
| 4,467,463 | 8/1984 | Yano | 369/45 |
| 4,475,179 | 10/1984 | Geyer | 369/45 X |
| 4,482,988 | 11/1984 | Tsurushima et al. | 369/45 |
| 4,615,355 | 10/1986 | Kasahara | 365/45 |
| 4,615,585 | 10/1986 | Van Sluys et al. | 369/45 X |
| 4,633,456 | 12/1986 | Luecke | 369/45 |
| 4,646,283 | 2/1987 | Ito et al. | 369/45 X |
| 4,679,904 | 7/1987 | Kurihara | 369/45 X |
| 4,680,743 | 7/1987 | Araki | 369/44 |

*Primary Examiner*—Aristotelis M. Psitos
*Attorney, Agent, or Firm*—Hill, Van Santen, Steadman & Simpson

[57] ABSTRACT

An optical pickup device comprising an objective lens having an optic axis for focusing a light beam emitted from a light source on an optical recording medium. The objective lens is carried on a support member which is coupled with a base through a coupling unit. The coupling unit has a first rotation axis parallel to the optic axis for permitting rotation of the support member about the first rotation axis in a tracking direction perpendicular to the optic axis and a second rotation axis perpendicular to the optic axis for permitting rotation of the support member about the second rotation axis in a focusing direction parallel to the optic axis. The support member has a center of gravity positioned substantially on the first rotation axis. A light beam reflected from the optical recording medium is sensed for exerting a force on the support member to move the objective lens in the focusing and/or tracking directions so as to adjust the optic axis to a desired position.

10 Claims, 16 Drawing Sheets

OPTICAL PICKUP DEVICE WITH OBJECTIVE LENS MOVABLE IN TWO DIRECTIONS

BACKGOUNRD OF THE INVENTION

This invention relates to an optical pickup device employing an objective lens having an optic axis for focusing a light beam radiated from a light source on an optical recording medium upon reproduction of the data recorded on the optical recording medium and, more particularly, to an optical pickup device in which the objective lens is supported for free movement in a focusing direction parallel to the optic axis and in a tracking direction perpendicular to the optic axis for the purpose of adjustment of the optic axis to a desired position.

Upon recording of data from a music or image source on an optical disc recording medium, the data are converted into a digital signal having logic "0" and "1" levels. According to the logic level, pits are formed to provide a continuous spiral recording track in the optical disc recording medium. An optical pickup device is used to reproduce the recorded data by radiating a light beam from a light source such as a semiconductor laser through an objective lens which focuses the light beam on the optical disc recording medium and senses the light beam reflected from the optical recording medium to determine the presence of pits. For this purpose, the objective lens is supported in such a manner that its optic axis can follow the spiral recording track while the optical disc is rotating during the data reproducing operation.

Furthermore, the objective lens is supported at a predetermined constant distance from the optical disc recording medium to focus the light beam so as to produce a light spot of a predetermined constant diameter. In order to provide a high accuracy detection of the pits formed in the optical disc recording medium, the error in the distance of the objective lens from the optical disc recording medium should be less than the pit depth, that is, about 0.1 micromillimeter. However, it is very difficult to retain the distance with such a high accuracy due to the poor finishing accuracy of the optical disc recording medium and the spindle mechanism on which the optical disc is placed. It is, therefore, current practice to avoid this difficulty by moving the objective lens in the focusing direction parallel to the optic axis so as to adjust the distance between the optical lens and the recording medium when the distance deviates from the predetermined value.

As described above, optical pickup devices have normally been designed to move the objective lens in a tracking direction perpendicular to the optic axis and also in a focusing direction parallel to the optic axis for the purpose of adjustment of the optic axis to a desired position. However, such a conventional optical pickup device is insufficient in its tendency to deviate from a desired position in the tracking direction when it is subject to an impact or sudden movement particularly in the tracking direction.

SUMMARY OF THE INVENTION

A main object of the invention is to provide an improved optical pickup device in which an objective lens having an optic axis for focusing a light beam on an optical recording medium is supported for free movement in a focusing direction parallel to the optic axis and in a tracking direction perpendicular to the optic axis.

It is another object of this invention to provide such an optical pickup device which can minimize the possibility of a deviation of the objective lens optic axis from a desired position when it is subject to an impact or sudden movement particularly in the tracking direction.

There is provided, in accordance with the invention, an optical pickup device comprising a base, an objective lens having an optic axis for focusing a light beam emitted from a light source on an optical recording medium, and a support member carrying the objective lens thereon. A coupling unit is coupled between the support member and the base. The coupling unit has a first rotation axis parallel to the optic axis for permitting rotation of the support member about the first rotation axis in a tracking direction perpendicular to the optic axis. The coupling unit also has a second rotation axis perpendicular to the optic axis for permitting rotation of the support member about the second rotation axis in a focusing direction parallel to the optic axis. The support member has a center of gravity positioned substantially on the first rotation axis. A light beam reflected from the optical recording medium is sensed for exerting a force on the support member to move the objective lens in the focusing and/or tracking directions to adjust the optic axis to a desired position.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numberals identify like elements in the several figures and in which:

DETAILED DESCRIPTION OF THE PREFERRED EMBODIMENTS

Figure 1:
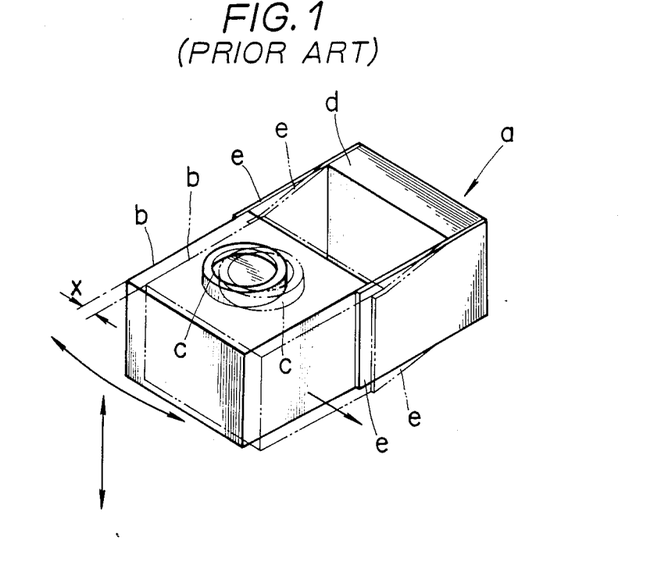
FIG. 1 is a perspective view showing a conventional optical pickup device.
Figure 2:
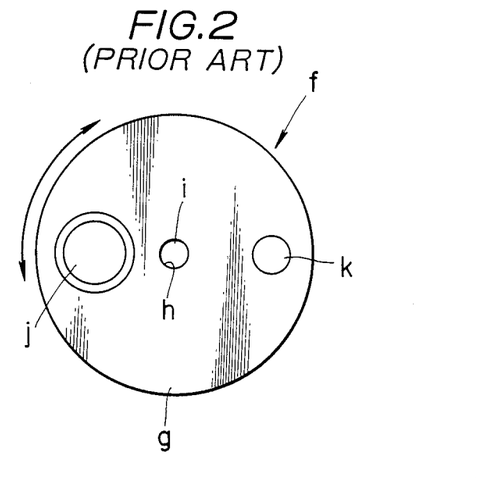
FIG. 2 is a plan view showing another type of conventional optical pickup device.
Figure 3:
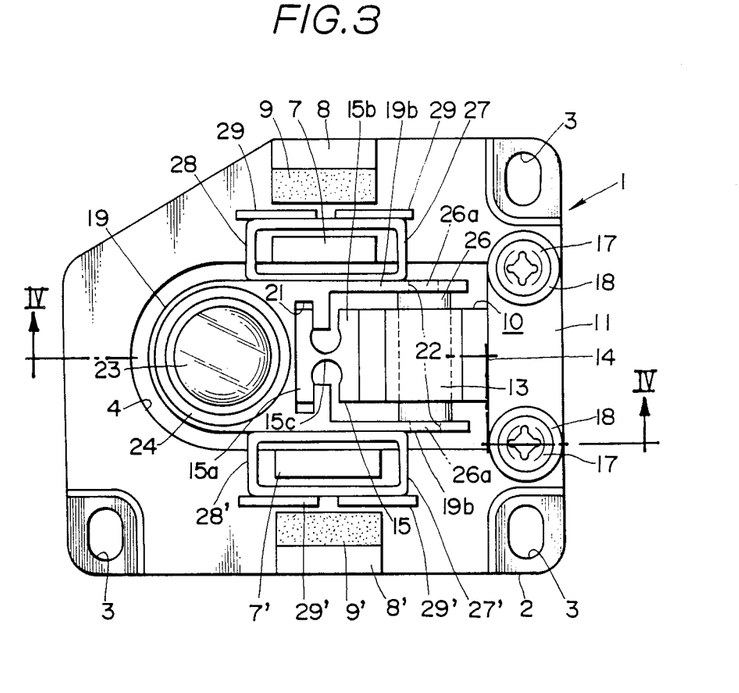
FIG. 3 is a plan view showing one embodiment of an optical pickup device made in accordance with the invention.
Figure 4:
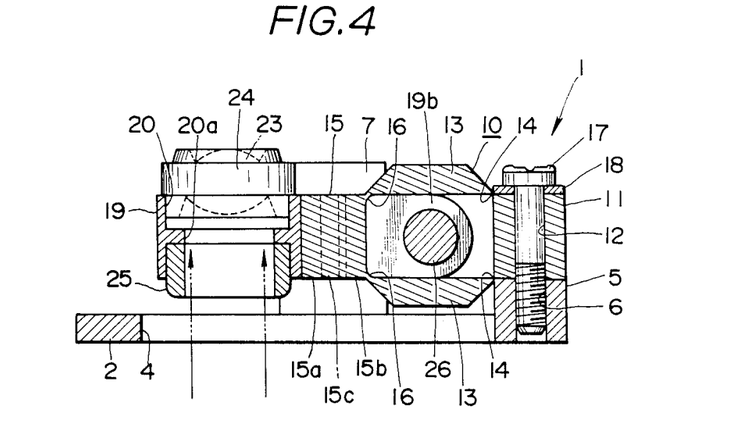
FIG. 4 is a section taken on line II—II in FIG. 3.
Figure 5:
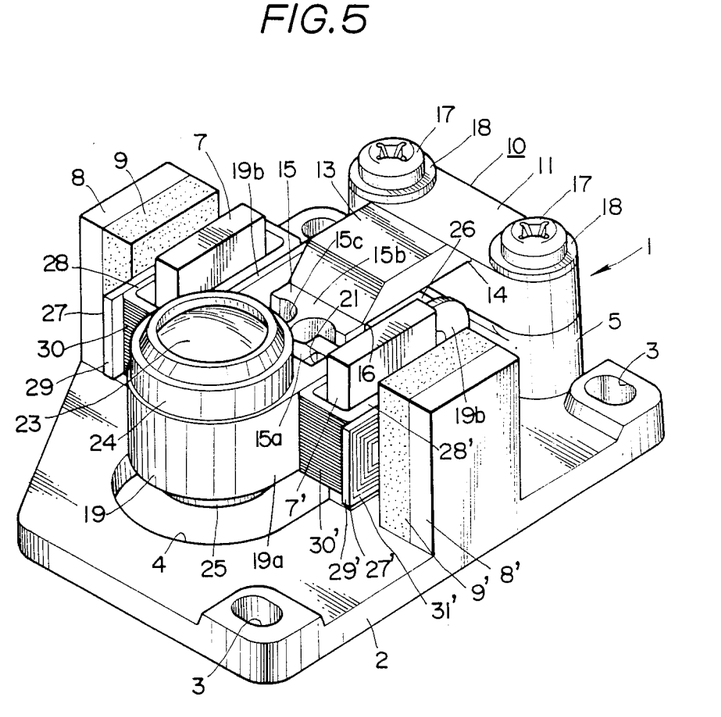
FIG. 5 is an enlarged perspective veiw of the optical pickup device of FIG. 3.
Figure 6:
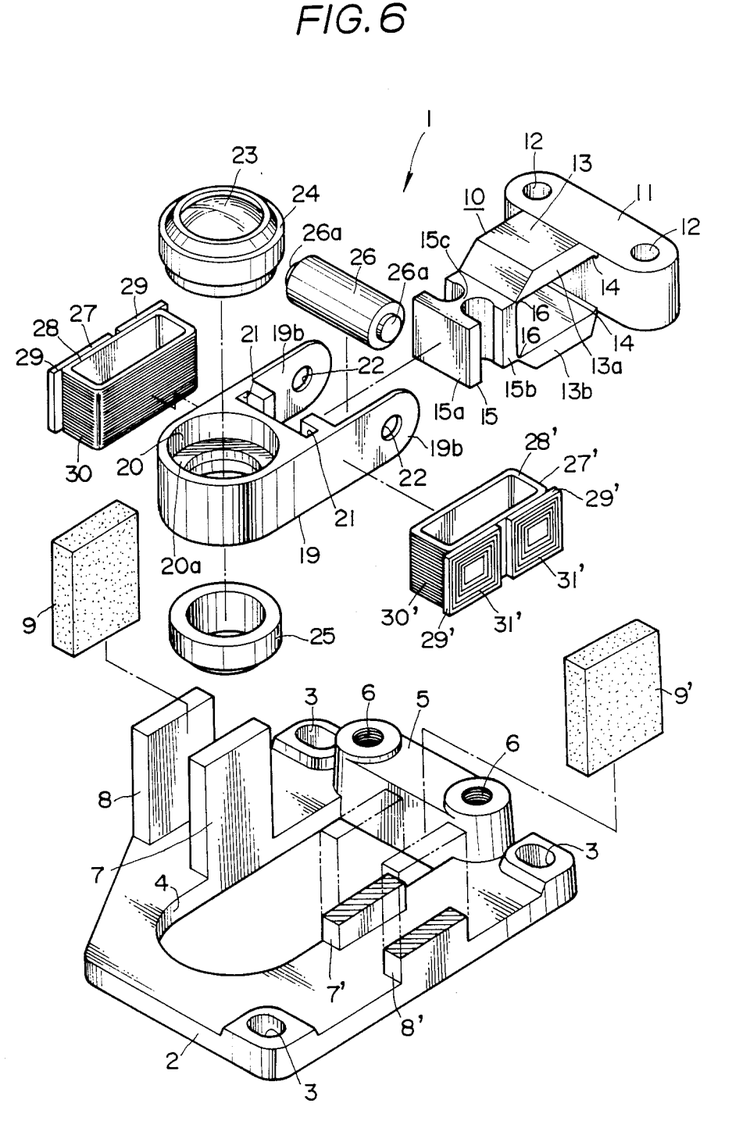
FIG. 6 is an enlarged exploded perspective view of the optical pickup device in FIG. 3.
Figure 7:
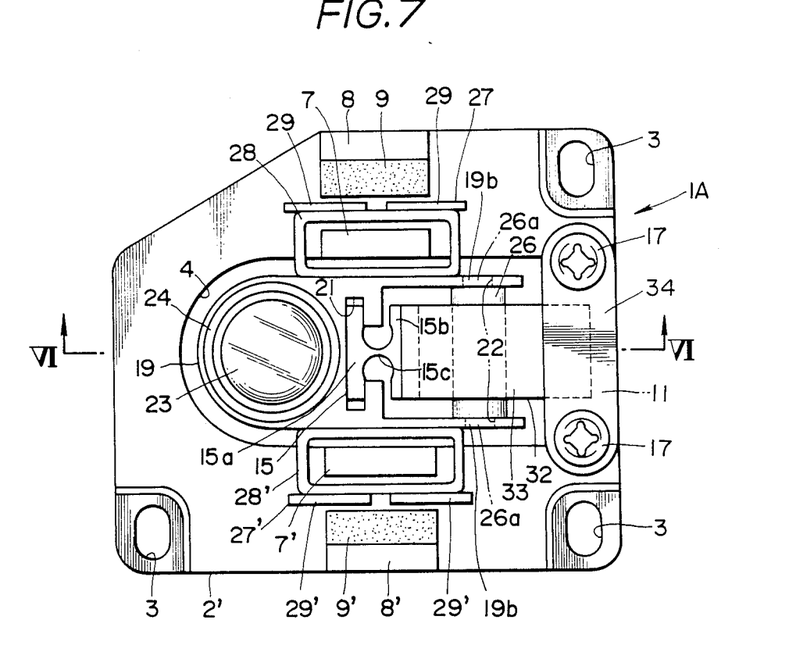
FIG. 7 is a plan view showing a second embodiment of the optical pickup device of the invention.
Figure 8:
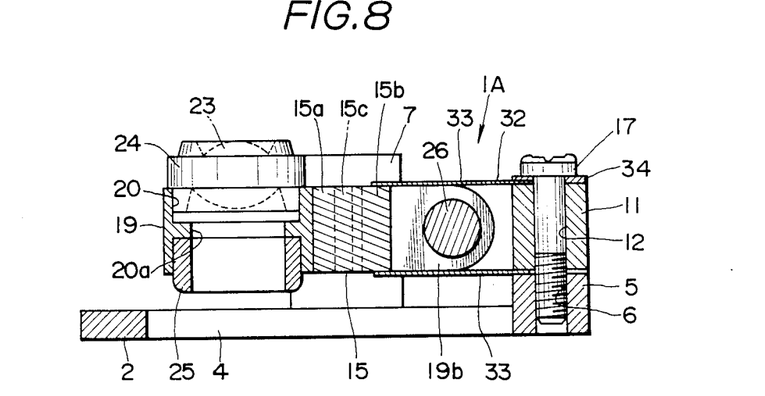
FIG. 8 is a section taken on line VI—VI in FIG. 7.
Figure 9:
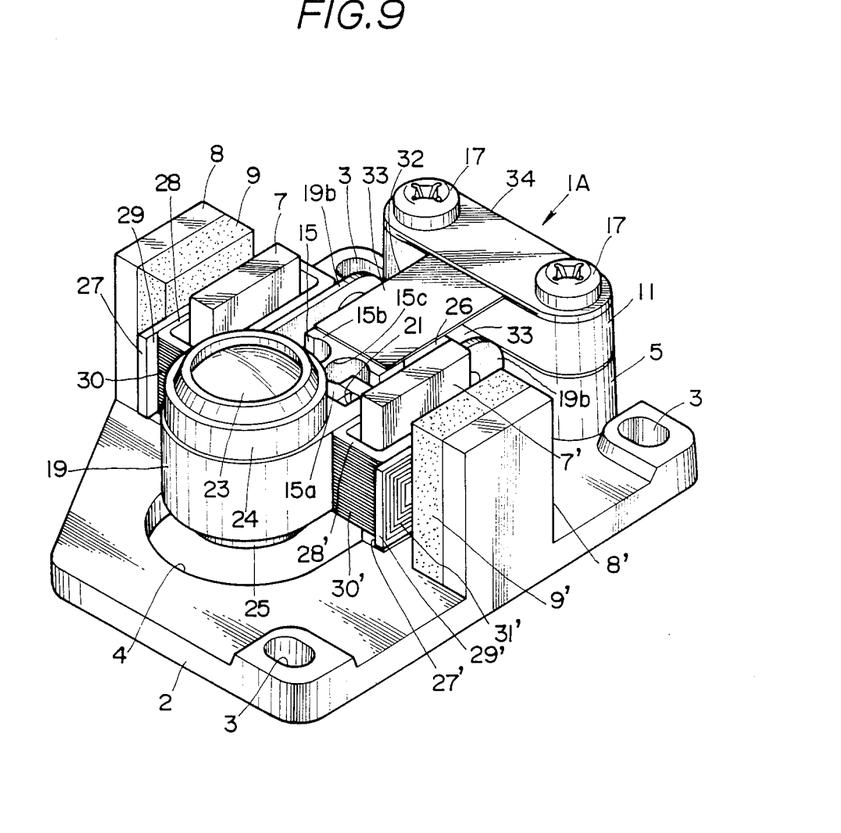
FIG. 9 is an enlarged perspective view of the optical pickup device of FIG. 7.
Figure 10:
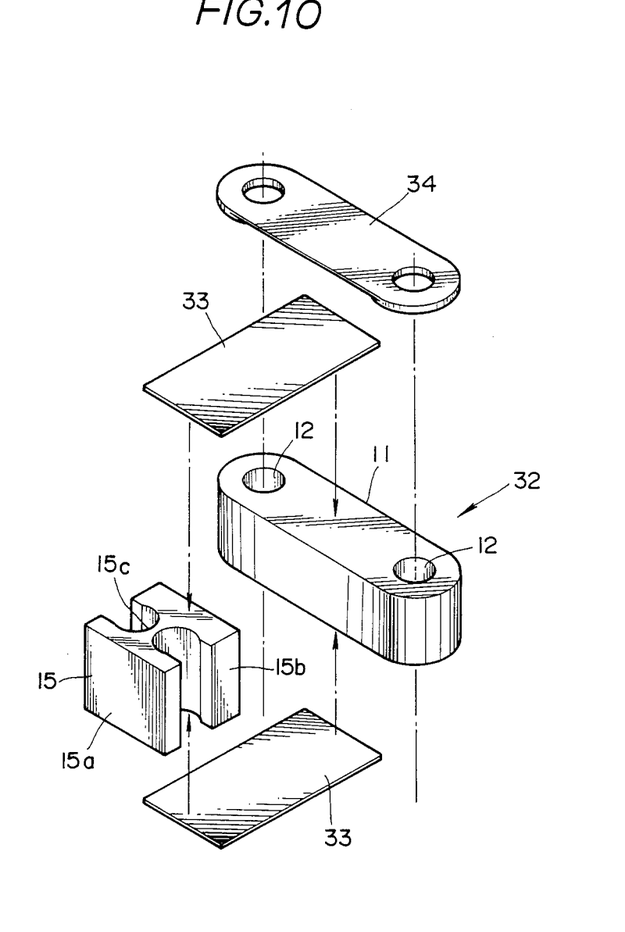
FIG. 10 is an enlarged exploded perspective view of the coupling member of FIG. 7.
Figure 11:
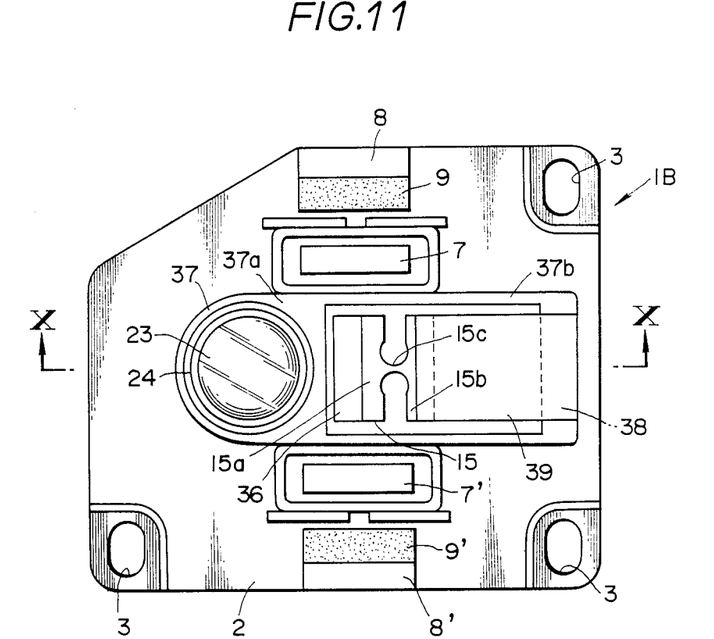
FIG. 11 is a plan view of a third embodiment of the optical pickup device of the invention.
Figure 12:
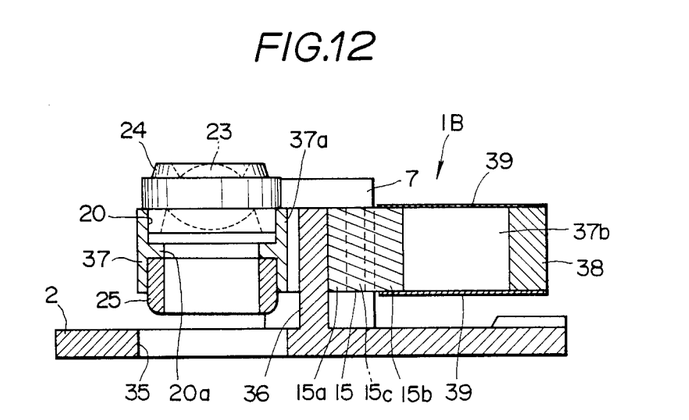
FIG. 12 is a section taken on line X—X of FIG. 11.
Figure 13:
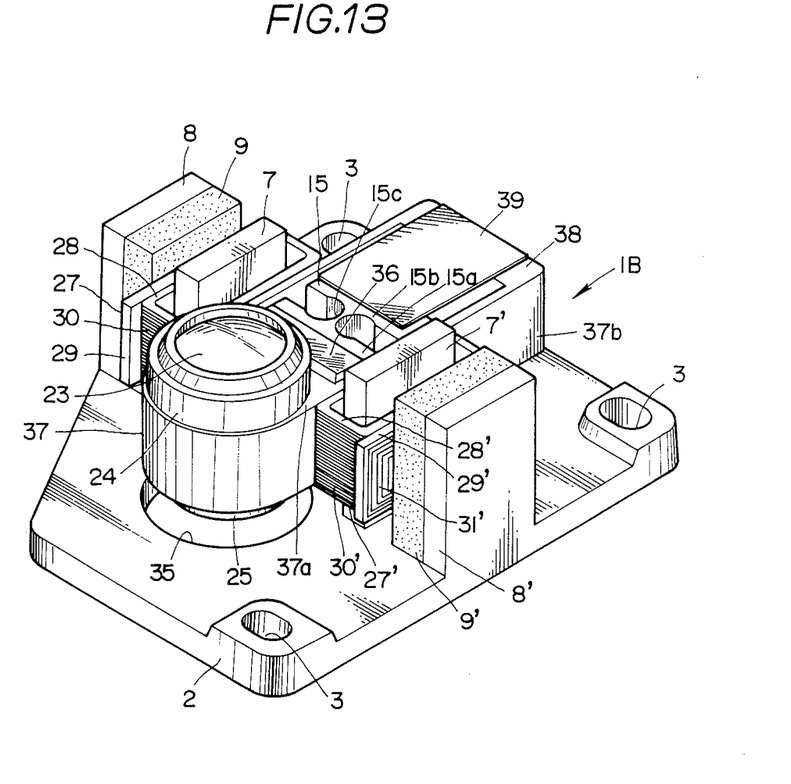
FIG. 13 is an enlarged perspective view of the optical pickup device of FIG. 11.
Figure 14:
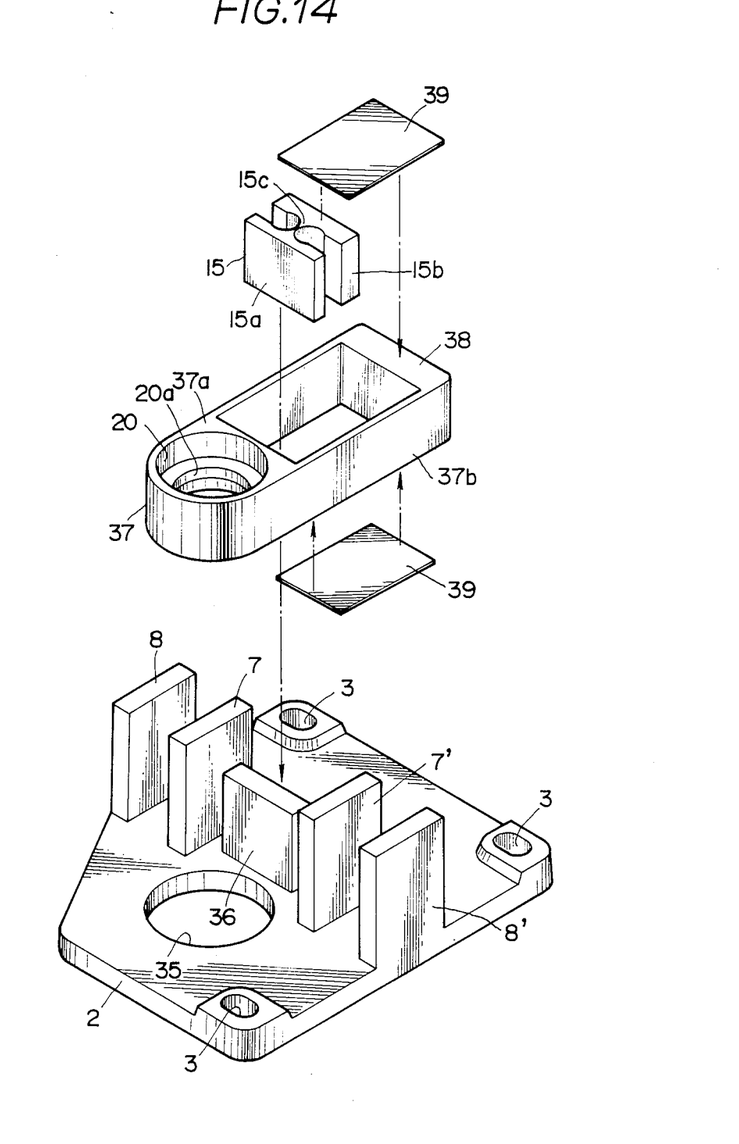
FIG. 14 is an enlarged exploded perspective view of the optical pickup device of FIG. 11.

Prior to the description of the preferred embodiments of the invention, the prior art optical pickup devices of FIGS. 1 and 2 are briefly described in order to provide a basis for a better understanding of the difficulties attendant thereon.

FIG. 1 shows a conventional optical pickup device disclosed, for example, in U.S. Pat. No. 4,449,213, filed by the assignee of the present invention. The optical pickup device, designated generally by the reference character a, includes a support member b which is coupled to a sliding member d through a pair of parallel resilient arms e such as leaf springs. An objective lens c is mounted on the support member b with its optic axis directed in a focusing direction. In this structure, the sliding member d can slide on a suitable member (not shown) in a direction parallel to the optic axis, permitting the support member b to move in the focusing direction, whereas the parallel resilient arms e can move to a direction perpendicular to the optic axis, permitting the support member b to move in the tracking direction. When an impact is applied on the optical pickup device a, however, a moment occurs to move the support member b a distance X in the tracking direction.

FIG. 2 shows another type of conventional optical pickup device disclosed, for example, in U.S. Pat. No. 4,482,988, filed by the assignee of the present invention. The optical pickup device, designated generally by the reference character f, includes a support cylinder g placed around a support shaft i extending through a through-hole h formed centrally in the support cylinder g. An objective lens j is mounted on the support cylinder g with its optic axis directed in a focusing direction. The reference character k designates a balancer weight provided on the support cylinder at a position opposite to the objective lens j with respect to the support shaft i to minimize the moment which would occur to rotate the support cylinder g when it is subject to an impact. The support shaft i is placed with a clearance in the through-hole h for permitting the support cylinder to rotate about and move along the support shaft. When an impact is applied on the optical pickup device f, however, the support cylinder g will move in the tracking direction within the clearance.

Referring to FIGS. 3 to 6, there is shown one embodiment of an optical pickup device made in accordance with this invention. The optical pickup device, generally designated by the numberal 1, includes an objective lens 23 for use in focusing a light beam radiated from an unshown light source on an optical disc recording medium (not shown). The objective lens 23 is attached on a support member 19 with its optic axis directed to the optical disc recording medium. The support member 19 is mounted on a base substrate 2 through a coupling unit 10 which has a first rotation axis parallel to the optic axis for permitting rotation of the support member 19 about the first rotation axis in a tracking direction perpendicular to the optic axis and also a second rotation axis perpendicular to the optic axis for permitting rotation of the support member 19 about the second rotation axis in a focusing direction parallel to the optic axis.

In greater detail, the objective lens 23 is fixed within an annular lens holder 24. The support member 19 has an aperture 20 having its inner surface conforming generally to the circumferential surface of the lens holder 24. An annular ring 20a is formed integrally on the inner surface of the aperture 20 substantially intermediate between the opposite ends of the aperture 20. The lens holder 24 is pressingly fitted in the aperture 20 with its bottom being in abutment on the annular ring 20a. A first balancer 25 is fixedly fitted in the lower half portion of the aperture 20 with its top being in abutment on the annular ring 20a. The support member 19 has a pair of rearward extending parallel wings 19b each having a hole 22 formed therein near its rear end. The parallel wings 19b carries a second balancer 26 which is of a cylindrical shape having small diameter portions 26a on the opposite ends thereof. The second balancer 26 is mounted between the parallel wings 19b with their small diameter portions 26a being fitted respectively in the holes 22. The parallel wings 19b also have inward extending projections formed near their forward ends to provide grooves 21 facing to each other.

A pair of drive coil assemblies, generally designated by the numerals 27 and 27' is attached on the opposite side surfaces of the support member 19, each including a rectangular coil frame 28, 28' around which a focusing coil 30, 30' is wound to produce magnetic lines of force directed in the focusing direction when it is energized. The focusing coils 30, 30' are attached on the opposite side surfaces of the support member 19. A pair of square coil plates 29, 29' is attached side by side on the outer side surface of each of the tracking coils 30, 30' with each carrying a tracking coil 30, 30' which produces magnetic lines of force directed in the tracking direction when it is energized.

The coupling unit 10 includes a mounting base 11 secured on the base substrate 1, a parallel link 13, and a hinge member 15, these parts being made integrally of a synthetic resin. The mounting base 11 is provided near its opposite ends with bolt holes 12 whereby it may be bolted to the base substrate 2. The hinge member 15 is of a cubic shape having cutouts formed in the opposite side surfaces thereof to provide a flexible thin hinge connection 15c between front and rear hinge members 15a and 15b, the hinge connection 15c having a hinge or first rotation axis parallel to the optic axis about which the front hinge member 15a can rotate with respect to the rear hinge member 15b. The parallel link 13 comprises upper and lower hinge members 13a and 13b extending in parallel-spaced relation between the mounting base 11 and the hinge member 15. The upper hinge member 13a is of a trapezoid shape having at its one end a flexible thinned portion connected with the upper edge of the mounting base 11 and at the other end thereof a flexible thinned portion connected with the upper edge of the rear hinge member 15b. Similarly, the lower hinge member 13b is of an inverted-trapezoid shape having at its one end a flexible thinned portion connected with the lower edge of the mounting base 11 and at the other end thereof a flexible thinned portion connected with the lower edge of the rear hinge member 15b. The coupling unit 10 is coupled to the support member 19 with its front hinge member 15a being fitted and received in the grooves 21 and with the second balancer 26 being placed between the upper and lower hinge member 13a and 13b. The parallel link 13 has a second rotation axis prependicular to the optic axis about which the hinge member 15 can rotate about the second rotation axis in the focusing direction with respect to the mounting base 11. It is, therefore, apparent from the foregoing that the coupling unit 10 has a first rotation axis parallel to the optic axis for permitting rotation of the support member 19 about the first rotation axis in the tracking direction perpendicular to the optic axis and a second rotation axis perpendicular to the optic axis for permitting rotation of the support member 19 about the second rotation axis in the focusing direction parallel to the optic axis. In other words, the coupling unit 10 permits the objective lens 23 to rotate in the focusing and/or tracking directions with respect to the base substrate 1.

The base substrate 2 has a mounting platform 5 formed on the rear end portion thereof at a position substantially intermediate between the opposite side edges. The mounting platform 5 is provided near its opposite ends with threaded holes 6 in which bolts 17 are threaded to secure the coupling unit mounting base 11 on the base substrate 1. The reference numeral 18 designates washers each interposed between the mounting base 11 and the bolt head.

The base substrate 2 is also provided with a center opening 4 formed in a shape which corresponds to and is slightly greater than that of the support member 19. A pair of inner yokes 7, 7' is provided on the base substrate 2 adjacent to the side edges of the center opening 4. The rectangular coil frames 28, 28' are placed loosely around the respective inner yokes 7 to permit the support member 19 to move in the focusing and tracking directions. The base substrate 2 is also provided thereon with a pair of outer yoke 8, 8' facing in parallel-spaced relation to the respective inner yokes 7. Magnets 9, 9', formed in the same shape as the inner and outer yokes 7 and 8, are attached on the inner surface of each of the outer yokes in such a manner that the inner and outer yokes 7, 7' and 8, 8' and the magnets 9, 9' establish a magnetic circuit producing magnetic lines of force perpendicular to the optic axis in which the drive coil assemblies 27, 27' are placed.

The base substrate 2 is provided at its corners with bolt holes 3 whereby it may be bolted on an unshown optical block which carries a semiconductor laser for producing a laser beam, a quarter-wave plate and a collimation lens through which the emitted laser beam is guided to the objective lens 23, a polarized beam splitter adapted to separate the incident beam into the laser beam emitted from the semiconductor laser and the beam reflected on the optical disc, a photo sensor for sensing the reflected beam, and a control circuit responsive to the photo sensor for producing focusing and tracking error signals which are used to produce a correction current to the focusing and tracking drive coils. The laser beam emitted from the semiconductor laser passes upward through the center opening 4 in the base substrate 2, as indicated by the two-dotted arrows in FIG. 4.

It is to be noted that the first and second balancers 25 and 26 are provided for the purpose of making up the balance of the weight of the support member 19 in such a manner as to position the center of gravity of the support member 19 on the first rotation or hinge axis of the hinge member 15. This is effective to minimize the possiblitiy of movement of the support member 19 causing the objective lens 23 to deviate in the tracking direction from a correct position when the optical pickup device 1 is subject to an impact or a sudden movement particularly in the tracking direction. It is preferable to adjust the weight balance of the support member 19 in such a manner as to position the gravity center on the first and second rotation axes to minimize the tendency of the objective lens 23 from deviating in the tracking and focusing directions from a correct position when the optical pickup device 1 is subject to an impact or a sudden movement.

The operation is as follows. The laser beam transmitted from the semiconductor laser device through the objective lens 23 is reflected on the optical disc. A part of the reflected beam from the optical disc returns through the objective lens 23 to the optical block which contains a control unit. The control unit receives a signal from the photo sensor and reads deviations of the position of the objective lens 23 in the focusing and tracking directions. The control unit provides correction currents, which correspond to the sensed deviations, to the focusing and tracking coils 30, 30' and 31, 31'. The current flows through the respective focusing coils 30, 30' placed in the magnetic flux produced in the magnetic circuit cause forces on the respective focusing coils 30, 30' to move the support member 19 in the focusing direction so as to correct the distance between the objective lens 23 and the optical disc recording surface. The direction of movement of the support member 19 is dependent both on the direction of the current flow through the focusing coils 30, 30' and on the direction of the magnetic flux produced in the magnetic circuit. In a similar manner, the current flows through the respective tracking coils 31, 31' placed in the magnetic flux produced in the magnetic circuit cause forces on the respective tracking coils 31, 31' to rotate the support member 19 in the tracking direction about the first rotation or hinge axis of the hinge member 15 so as to direct the objective lens optic axis to the center of the optical disc recording track. The direction of rotation of the tracking coils 31, 31' is dependent on the direction of the current flows through the tracking coils 31, 31' and also on the direction of the magnetic flux produced in the magnetic circuit.

Referring to FIGS. 7 to 10, there is shown a second embodiment of the invention which differs from the first embodiment only in the support arm arrangement. Accordingly, like parts are designated by like reference numerals.

In this embodiment, the coupling unit 32 includes a parallel link comprised of two resilient plates such for example as leaf springs 33 which are placed in parallel-spaced relation to couple the hinge member 15 with the mounting base 11. The upper leaf spring 33 has a front end portion sticked on the upper surface of the rear hinge member 15b and a rear end portion sticked on the upper surface of the mounting base 11. The lower leaf spring 33 has a rear end portion sticked on the lower surface of the rear hinge member 15b and a rear end portion attached on the lower surface of the mounting base 11. The reference numeral 34 designates a washer secured by the bolts 17 on the upper surface of the base 11 to press the upper leaf spring rear end portion against the upper surface of the mounting base 11. The lower leaf spring rear end portion is sandwiched between the mounting base 11 and the mounting platform 5. The parallel link 32, comprised of the upper and lower leaf springs 33, has a resilient property permitting rotation of the support member 19 about a second rotation axis in the focusing direction with respect to the mounting base 11. It is, therefore, apparent that, also in this embodiment, the coupling unit 32 has a first rotation axis parallel to the optic axis for permitting rotation of the support member 19 about the first rotation axis in the tracking direction perpendicular to the optic axis and a second rotation axis perpendicular to the optic axis for permitting rotation of the support member 19 about the second rotation axis in the focusing direction parallel to the optic axis.

Referring to FIGS. 11 to 14, there is shown a third embodiment of the invention wherein the reference numeral 37 designates a support member which carries the objective lens 23 thereon. The support member 37 differs from that of the first embodiment in that the parallel wings are connected integrally by a rear frame 38. The rear frame 38 also serves as such a second balancer as described in connection with the first embodiment.

The coupling unit includes a parallel link comprised of two resilient plates such for example as leaf springs 39 placed in parallel-spaced relation to connect the hinge member 15 with the support member rear frame 38. The upper leaf spring 39 has a front end portion engaging on the upper surface of the rear hinge member 15b and a rear end portion attached on the upper surface of the rear frame 38. The lower leaf spring 39 has a front end portion sticked on the lower surface of the rear hinge member 15b and a rear end portion engaging the lower surface of the rear frame 38. The front hinge member 15a engages the rear surface of a mounting member 36 provided on the base substrate 2. The base substrate 2 is formed with a circular opening 35 which corresponds to the circular aperture 20 provided in the support member 37. The parallel link, comprised of the upper and lower leaf springs 39, has a resilient property permitting rotation of the support member 19 about a second rotation axis in the focusing direction with respect to the mounting member 36. It is, therefore, apparent that, also in this embodiment, the coupling unit has a first rotation axis parallel to the optic axis for permitting rotation of the support member 37 about the first rotation axis in the tracking direction perpendicular to the optic axis and a second rotation axis perpendicular to the optic axis for permitting rotation of the support member 37 about the second rotation axis in the focusing direction parallel to the optic axis. A balance weight 25 is secured in the circular opening 20 in the same manner as described in connection with the first embodiment to position the gravity center of the support member 37 on the first rotation or hinge axis of the hinge member 15.

In the optical pickup device of the invention, the support member carrying an objective lens thereon is coupled to a base substrate through a coupling unit which has a first rotation axis for permitting rotation of the support member about the first rotation axis in a tracking direction and a second rotation axis for permitting rotation of the support member about the second rotation axis in a focusing direction. The support member is designed to have a center of gravity positioned substantially on the first rotation axis so as to minimize the possibility of a deviation of the optic axis of the objective lens in the tracking direction from a desired position when the optical pickup device is subject to an impact or sudden movement particularly in the tracking direction.

While this invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An optical pickup device comprising:
    an objective lens having an optical axis for focusing a light beam emitted from a light beam source on an optical recording medium;
    a support member supporting said objective lens thereon;
    electromagnetic coil members secured to said support member and arranged to move said objective lens in a first direction parallel to said optical axis and in a second direction perpendicular to said optical axis;
    a parallel link means supporting said support member for movement in said first direction;
    a base plate supporting said parallel link means;
    a coupling unit including a hinge portion and a pair of hinge members each connected to said hinge portion, one of said pair being supported by said parallel link means and the other of said pair being fixed to said support means;
    said coupling unit supporting said support member for movement in said second direction;
    said coupling unit having a center of gravity substantially coinciding with the center of gravity of said support member.

2. An optical pikcup device according to claim 1, wherein said parallel link means and said coupling unit are integral with each other and are made of a synthetic resin.

3. An optical pickup device according to claim 2, which includes:
    a mounting base secured to said base plate;
    a pair of plate like portions movable in a direction parallel to said first direction, one end of each of said pair of plate like portions being hingedly connected to said other hinge member, and the other ends of said pair of plate like portions being hingedly connected to said mounting base.

4. An optical pickup device according to claim 3, wherein said support member carries a first balancer.

5. An optical pickup device according to claim 4, wherein said support member includes parallel arms and a second balancer extending between said parallel arms to balance said first balancer.

6. An optical pickup device according to claim 1 which includes:
    a mounting base secured to said base plate; and
    a pair of leaf springs disposed in parallel spaced relation between a hinge member and said mounting base.

7. An optical pickup device according to claim 6, wherein said support member carries a first balancer.

8. An optical pickup device according to claim 7, wherein said support member includes a parallel arms and a second balancer extending between said parallel arms to balance the first balancer.

9. An optical pickup device comprising:
    an objective lens having an optical axis for focusing a light beam from a light beam source onto an optical recording medium;
    a support member supporting said objective lens, said support member having a lens supporting portion and a rear frame portion being connected to said lens supporting portion with a pair of arm portions;
    coil members positioned to displace said objective lens in a first direction parallel to said optical axis and a second direction perpendicular to said optical axis, said coil member being secured to said support member;
    a parallel link means supporting said support member for movement in said first direction;
    a base plate supporting said parallel link means;
    electromagnets actuated by said coil members;
    a coupling unit having a hinge portion, and a pair of hinge members each connected to said hinge portion, one of said pair being supported by said parallel link means and the other of said pair being fixed to said base plate;

said coupling units supporting said support member for movement in said second direction, said coupling unit having a center of gravity substantially coinciding with the center of gravity of said support member in said second direction.

10. An optical pickup device according to claim 9, wherein said parallel link means includes a pair of leaf springs in parallel spaced relation between the hinge members of said coupling unit and said support member.

* * * * *